United States Patent [19]
Kubota et al.

[11] Patent Number: 4,602,482
[45] Date of Patent: * Jul. 29, 1986

[54] CAP SEAL STRUCTURE IN RESERVOIR TANK FOR MASTER CYLINDER

[75] Inventors: Hitoshi Kubota, Minami-ashigara; Sachio Ohno, Zama, both of Japan

[73] Assignee: Nissan Motor Co., Ltd., Yokohama, Japan

[*] Notice: The portion of the term of this patent subsequent to Apr. 13, 2001 has been disclaimed.

[21] Appl. No.: 577,765

[22] Filed: Feb. 7, 1984

[30] Foreign Application Priority Data

Feb. 10, 1983 [JP]  Japan ............................. 58-18309[U]

[51] Int. Cl.$^4$ ............................................. B60T 11/26
[52] U.S. Cl. ..................................... 60/585; 60/592; 220/304
[58] Field of Search .................... 60/585, 592; 220/304

[56] References Cited

U.S. PATENT DOCUMENTS

| | | | |
|---|---|---|---|
| 2,746,574 | 5/1956 | Smith et al. | 60/585 |
| 3,023,924 | 3/1962 | Boyer | 60/585 |
| 3,654,956 | 4/1972 | Tsubouchi | 60/585 |
| 4,192,345 | 3/1980 | Fujii et al. | 60/592 |
| 4,198,824 | 4/1980 | Nogami et al. | 60/535 |
| 4,355,512 | 10/1982 | Kubota et al. | 60/534 |
| 4,385,495 | 5/1983 | Kubota | 60/592 |
| 4,393,655 | 7/1983 | Komorizono | 60/585 |
| 4,500,761 | 2/1985 | Kubota et al. | 60/585 |
| 4,514,984 | 5/1985 | Kubota | 60/585 |

FOREIGN PATENT DOCUMENTS

54-121371  9/1979  Japan.
56-31854  3/1981  Japan.
59-31557  2/1984  Japan.

*Primary Examiner*—Robert E. Garrett
*Assistant Examiner*—Richard S. Meyer
*Attorney, Agent, or Firm*—Schwartz, Jeffery, Schwaab, Mack, Blumenthal & Evans

[57] ABSTRACT

A reservoir tank includes a cap, a strainer, and a cap seal which is attached to the cap so as to prevent hydraulic fluid in the reservoir tank from leaking out. The cap seal is integrally formed with a cylindrical projection which is adapted to be pressed in resilient engagement with the outer periphery of the strainer, so that an inner space within the strainer defined by the inner side of the cap, the cap seal, the wall of the strainer, and the surface of the hydraulic fluid is separated by the projection from an outer space defined by the wall of the reservoir tank, the wall of the strainer and the surface of the hydraulic fluid. A tip of the projection of the cap seal is lower than the lower end of a thread portion of the cap when the cap engages with the reservoir tank. Therefore, hydraulic fluid adhering to an inner part of the cap and the cap seal does not drip and adhere to the thread portion of the cap. Furthermore, there is provided at the outer periphery of the strainer a passage comprising radial and vertical channels through which the outer space is communicated with the inner space, so that air retained in the outer space can escape into the inner space.

6 Claims, 5 Drawing Figures

CAP SEAL STRUCTURE IN RESERVOIR TANK FOR MASTER CYLINDER

BACKGROUND OF THE INVENTION

This invention relates to a structure of a cap seal in a reservoir tank for storing hydraulic fluid to be used in a master cylinder.

A known type of reservoir tank 1 is illustrated in FIG. 1, which is adapted to be mounted on an upper surface of a master cylinder (not shown) for storing hydraulic fluid. Formed at the lower part of the inside of the reservoir tank 1 is a rib 3, on the upper end surface of which a hat-shaped strainer 5 having a rib 4 formed therein is disposed. A cap 8 is threaded onto the upper portion of the outer periphery of the reservoir tank 1 in such a manner to cover the upper opening of the reservoir tank 1. A seal case 9 fitted to the interior side of the cap 8 comprises a disk-shaped base 10, a cylindrical cap seal container 11 formed on the outer end of the base 10, and a disk-shaped baffle 12 formed on the lower surface of the base 10. Formed on the outer periphery of the cap seal container 11 is an annular channel 13 in which a cap seal 14 is received so as to resiliently contact with the inner periphery of the reservoir tank 1 when the cap 8 is engaged with the reservoir tank 1.

However, there are drawbacks in a structure of the conventional reservoir tank 1 for the master cylinder of this type. Due to jerking or jolting of a vehicle body, hydraulic fluid 2 may splash against and may adhere to the base 10 and the baffle 12. As a result, when an inspector removes and tilts the cap 8 for the purpose of inspecting the inside of the reservoir tank 1, the hydraulic fluid 2 adhering to the base 10 and baffle 12 may drip on a female thread section of the cap 8 as shown in FIG. 2. Therefore, when the cap 8 is again threaded onto the reservoir tank 1, the hydraulic fluid 2 which adheres to the female thread section may drip on and run down along the outer periphery of the reservoir tank 1. This may lead to a misunderstanding that the hydraulic fluid 2 might have leaked out from the reservoir tank 1.

To overcome this problem, there has been proposed a cap seal which has an annular or cylindrical projection a tip of which projects closer to the hydraulic fluid side than the lower end surface of the cap 8, thereby preventing hydraulic fluid 2 adhering to the base 10 and the baffle 12 from dripping on and adhering to the internal thread section of the cap 8 even when the cap 8 is removed and tilted as shown in FIG. 2. Such cap seal having the annular or cylindrical projection is detailed in copending U.S. Pat. No. 4,514,984, filed on June 13, 1983 which is assigned to the assignee of this application and incorporated herein by reference.

Although successful in eliminating the misunderstanding, since the tip of the projection comes in contact with the strainer 5, a space defined by the reservoir tank 1, the strainer 5 and a surface of the hydraulic fluid 2, which may be viewed from the outside of the reservoir tank 1, is completely sealed by the cap seal. This causes the level of the hydraulic fluid 2 in the reservoir tank 1 to be lowered by means of the air sealed therein or raised due to negative pressure of the sealed air and therefore the level is viewed as being lower or higher than the actual or true level of the hydraulic fluid 2 in the reservoir tank 1, respectively, which might lead the inspector to misunderstand the amount of the hydraulic fluid 2 in the reservoir tank 1. In order to solve this problem, a gap may be provided between the tip of the projection and the upper surface of the strainer 5 thereby permitting an escape of the air in the space. In this case, however, since the strainer 5 must be lowered to provide the gap, the capacity of the reservoir tank 1 may be reduced.

SUMMARY OF THE INVENTION

It is an object of the invention to provide a cap seal structure in a reservoir tank for a master cylinder which may completely prevent leakage of hydraulic fluid stored in a reservoir tank.

Another object of the invention is to provide a cap seal structure in a reservoir tank which may increase the capacity of the reservoir tank and prevent a inspector from misunderstanding the amount of the hydraulic fluid in the reservoir tank upon engaging a cap with the reservoir tank.

Briefly described, these and other objects of the present invention are accomplished by the provision of an improved cap seal structure comprising a cap seal attached to the cap for sealing the reservoir tank to preventing leakage of the hydraulic fluid in the reservoir tank. The cap seal comprises a base and a projection extending from the base, a tip of which is lower than the lower end of the engaging portion of the cap upon engaging the cap with the reservoir tank. The structure further includes a passage which is adapted for communicating a first space defined by the reservoir tank, the strainer, and the hydraulic fluid to a second space defined by the cap, the cap seal, the strainer, and the hydaulic fluid.

BRIEF DESCRIPTION OF THE DRAWINGS

These and other objects, features and advantages of the present invention will be more apparent from the following description of a preferred embodiment, taken in conjunction with the accompanying drawings, in which.

DETAILED DESCRIPTION OF THE INVENTION

Figure 1:
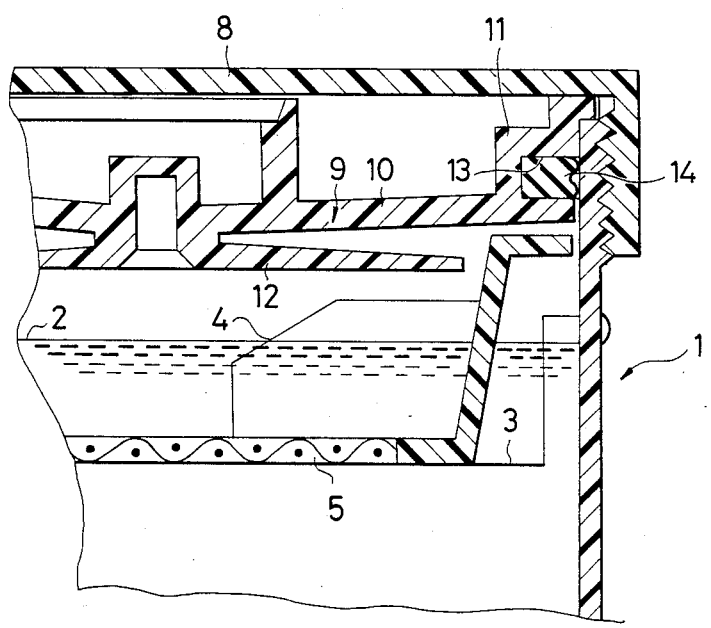
FIG. 1 is a partial cross sectional view of a conventional reservoir tank for a master cylinder.
Figure 2A:
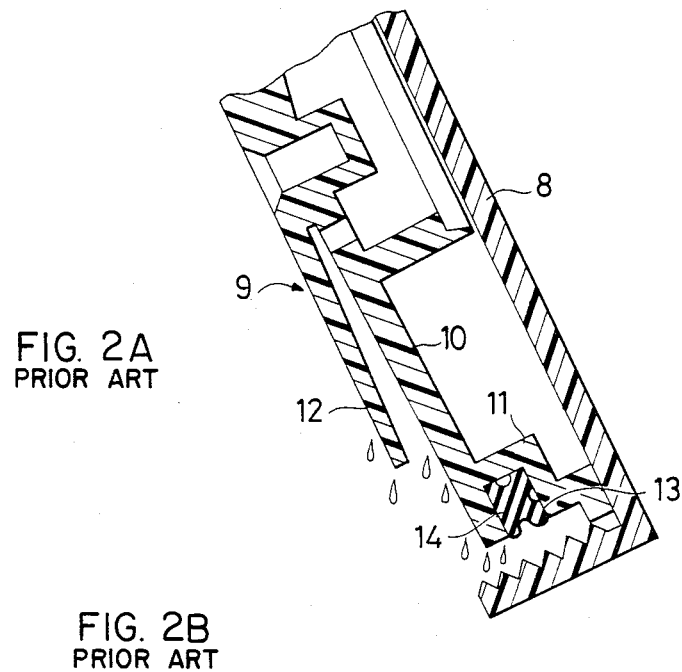
FIGS. 2a and 2b are respectively partial cross sectional views of the cap and the conventional reservoir tank shown in FIG. 1 showing a state in which the cap is removed and tilted.
Figure 2B:
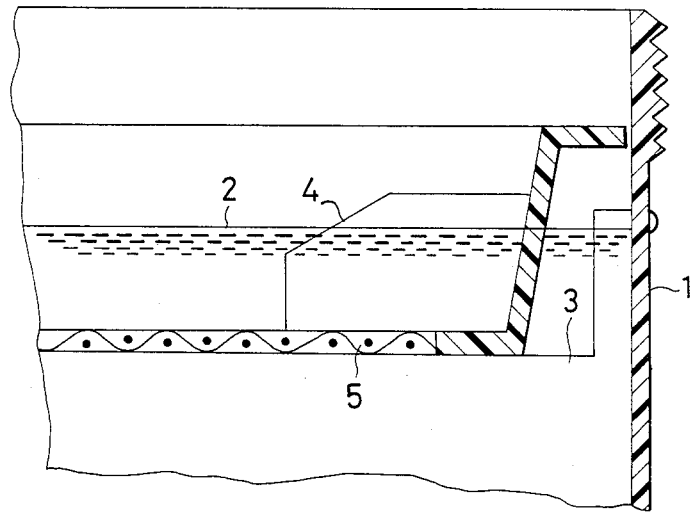
Figure 3:
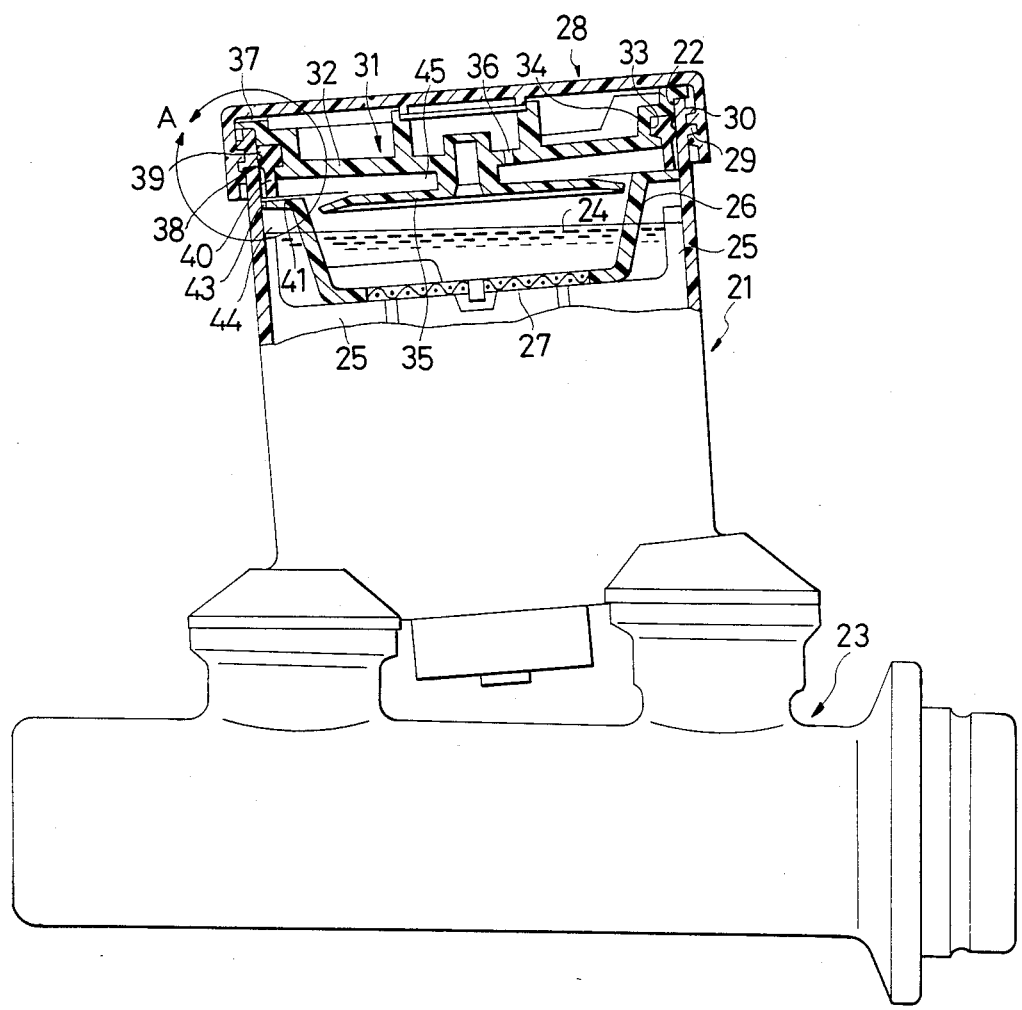
FIG. 3 is a partially cutaway side view of a reservoir tank embodying the present invention.
Figure 4:
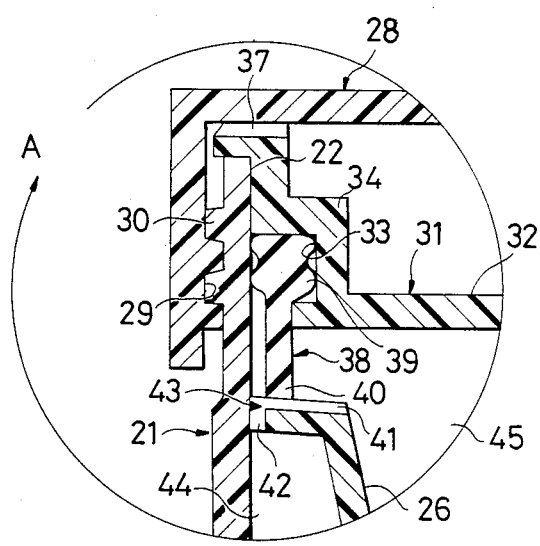
FIG. 4 is an enlarged detail within the circular arrow A shown in FIG. 3.

Referring to FIG. 3 and 4, a cup-type reservoir tank 21 having a hydraulic fluid injection opening 22 at the upper end thereof is installed on a master cylinder 23 for the brake system. Hydraulic fluid 24 to be used in the master cylinder 23 is stored in the reservoir tank 21. A plurality of ribs 25 are formed within the reservoir tank 21, on the upper end of which a strainer 26 for filtering the hydraulic fluid 24 to be injected into the reservoir tank 21 is fitted. The strainer 26 is of an inverted hat shape in cross section, at the lower end of which a filter 27 is fitted. The reservoir tank 21 has a cap 28 formed with an internal thread 29 on the inner periphery thereof. The cap 28 is adapted to close the hydraulic fluid injection opening 22 by engaging the internal thread 29 with an external thread 30 formed on the outer periphery of the reservoir tank 21. Fixed within the cap 28 is a seal case 31 which includes a disk-shaped base 32, a substantially cylindrical cap seal container 34 having an annular channel 33 of substantially L shape in cross section on its outer periphery, and a disk-shaped baffle 35 being formed at the lower surface of the base 32. A through hole 36 is formed in the central portion of said base 32 and also a radially extending channel 37 is formed at the upper surface of the cap seal container 34, which permits air within the reservoir tank 21 to escape therefrom, so that secure engagement of the cap 28 with the reservoir tank is allowed. A cap seal 38 is provided between the base 32 of the cap 28 and the reservoir tank 21 and comprises an annular base 39 of substantially H shape in cross section which is made of a flexible material and a cylindrical projection 40 integrally connected to the lower surface of the base 39. In detail, the cap seal 38 is mounted to the cap 28 in such a manner that the base 39 is fitted within the channel 33 to resiliently contact the outer periphery of the base 32 with the inner periphery of the reservoir tank 21. Consequently, the cap seal 38 may prevent leakage of the hydraulic fluid 24 stored in the reservoir tank 21. The tip of the projection 40 is located lower than the lower end of the internal thread 29 of the cap 28, namely closer to the level of hydraulic fluid 24, so that the seal case 31 and the cap 28 are separated from each other by the projection 40. Furthermore, the tip of the projection 40 is in resilient contact with the upper surface of the outer end portion of the strainer 26, thereby pressing the strainer 26 to the ribs 25. Consequently, the floating of the strainer 26 is restricted and when the strainer 26 is raised, the projection 40 may be distorted and the movement of the strainer 26 is absorbed. Furthermore, a radially extending channel 41 is formed at the upper surface of the strainer 26 where the tip of the projection 40 is in resilient contact therewith, while a vertically extending channel 42 is formed at the outer end surface of the strainer 26 so as to communicate to the radial channel 41 in an outer peripheral position of the cap seal 38. The radial channel 41 and vertical channel 42 constitute a passage 43 communicating between a first space 44 defined by the reservoir tank 21, the strainer 26, and the level of hydraulic fluid 24 and a second space 45 defined by the cap 28, the cap seal 38, the strainer 26, and the level of hydraulic fluid 24. Thus, the first space 44 and the second space 45 are placed under an equal pressure.

In operation, if the hydraulic fluid 24 splashes upwards and adheres to the base 32 and the baffle 35 as aforementioned and when an inspector removes and tilts the cap 28 for the purpose of inspecting the inside of the reservoir tank 21, the hydraulic fluid 24 which adheres to the base 32 and the baffle 35 may drip downwards. However, since the projection 40 is adapted to separate the inner periphery of the cap 28 from the base 32 and the baffle 35 as aforementioned, the hydraulic fluid 24 drips securely on the inner surface of the projection 40, namely does not drip and adhere to the female thread 29 of the cap 28. Incidentally, the hydraulic fluid 24 adhering to the projection 40 may drip from its lower end. Therefore, when the cap 28 is again threaded onto the reservoir tank 21, the hydraulic fluid 24 will not drip on the outer periphery of the reservoir tank 21. Furthermore, upon engaging the cap 28 with the reservoir tank 21, the tip of the projection 40 is brought into contact with the strainer 26. Thereafter even when the cap 28 is threaded further, the air within the first space 44 defined by the reservoir tank 21, the strainer 26, and the level of hydraulic fluid 24 flows into the second space 45 defined by the cap 28, the cap seal 38, the strainer 26, and the level of the hydraulic fluid 24 through the passage 43. Therefore, the first space 44 and the second space 45 are placed under an equal pressure, so that the level of hydraulic fluid 24 under the first space 44 is substantially the same as the actual level in the reservoir tank. Also, the tip of the projection 40 is in resilient contact with the upper surface of the outer end portion of the strainer 26 thereby pressing the strainer 26 to the ribs 25. Consequently, the floating of the strainer 26 is restricted and when the strainer 26 is raised, the projection 40 may be distorted so that the movement of the strainer is absorbed. Accordingly, the capacity of the reservoir tank 21 may therefore be increased. Furthermore, even if hydraulic fluid 24 splashes up and bursts out of the vertical channel 42 upwardly, the hydraulic fluid 24 enters a space between the projection 40 of the cap seal 38 and the inner periphery of the reservoir tank 21 and its force may be reduced, so that the hydraulic fluid 24 can be prevented from entering directly into the second space 45 and passing through a through hole 36 upwardly.

It is further understood by those skilled in the art that the foregoing description is a preferred embodiment of the invention and that various changes and modifications may be made in the invention without departing from the spirit and scope thereof.

What is claimed is:

1. In a reservoir tank which includes a strainer for filtering hydraulic fluid to be injected into the reservoir tank through a hydraulic fluid injection opening of the reservoir tank and a cap being engaged with said reservoir tank to close the hydraulic fluid injection opening, a cap seal structure located between the cap and the reservoir tank for retaining the hydraulic fluid stored in the reservoir tank comprising:

a cap seal attached to the cap for sealing the reservoir tank to prevent leakage of the hydraulic fluid from the reservoir tank, said cap seal comprises a base and a projection extending from the base, a tip of which is lower than the lower end of an engaging portion of the cap upon engaging the cap with the reservoir tank so that hydraulic fluid adhering to the cap and the cap seal is prevented from dripping on and adhering to the engaging portion of the cap when removing the cap from the reservoir tank; and a first passage for communicating a first space defined by the reservoir tank, the strainer, and the hydraulic fluid to a second space defined by the cap, said cap seal, the strainer, and the hydraulic fluid to place the first and second spaces under an equal pressure when the cap engages with the reservoir tank.

2. A cap seal structure as claimed in claim 1, in which the tip of the projection of said cap seal is in contact with the strainer and in which said first passage is formed at the portion of the strainer where the tip of the project portion is in contact therewith.

3. A cap seal structure as claimed in claim 2, in which said first passage comprises a radially extending channel formed at the upper surface of the strainer where the tip of the projection is in contact therewith and a vertically extending channel formed at an outer end surface of the strainer so as to communicate to the radially extending channel.

4. A cap seal structure as claimed in claim 1, in which said cap seal is made of a flexible material.

5. A cap seal structure as claimed in claim 4, in which the cap includes a seal case for holding said cap seal, the seal case comprises a disk-shaped base and a substantially cylindrical cap seal container having an annuler channel into which the base of said cap seal is fitted.

6. A cap seal structure as claimed in claim 5, in which the cap further includes a second passage for permitting air in the second space to escape from the second space, the second passage comprises a through hole formed in the central portion of the base and a radially extending channel formed at the upper surface of the cap seal container.

* * * * *